United States Patent
Lisbakken

(10) Patent No.: US 8,306,858 B2
(45) Date of Patent: Nov. 6, 2012

(54) CONSOLIDATED CONTENT ITEM REQUEST FOR MULTIPLE ENVIRONMENTS

(75) Inventor: Ben Lisbakken, San Francisco, CA (US)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 12/836,212

(22) Filed: Jul. 14, 2010

(65) Prior Publication Data
US 2012/0016749 A1    Jan. 19, 2012

(51) Int. Cl.
*G06Q 30/00*    (2012.01)
(52) U.S. Cl. .................................................. 705/14.71
(58) Field of Classification Search ................ 705/14.71
See application file for complete search history.

(56) References Cited

U.S. PATENT DOCUMENTS

| | | | |
|---|---|---|---|
| 5,038,346 A | 8/1991 | Courtois | |
| 6,067,565 A | 5/2000 | Horvitz | |
| 6,285,987 B1 * | 9/2001 | Roth et al. | 705/14.71 |
| 6,438,592 B1 | 8/2002 | Killian | |
| 6,725,421 B1 | 4/2004 | Boucher et al. | |
| 6,775,267 B1 | 8/2004 | Kung et al. | |
| 6,795,848 B1 | 9/2004 | Border et al. | |
| 6,807,570 B1 | 10/2004 | Allen et al. | |
| 6,907,566 B1 | 6/2005 | McElfresh et al. | |
| 7,136,875 B2 | 11/2006 | Anderson et al. | |
| 7,657,611 B2 | 2/2010 | Tsun et al. | |
| 2001/0054001 A1 | 12/2001 | Robinson | |
| 2002/0055966 A1 | 5/2002 | Border et al. | |
| 2002/0072989 A1 | 6/2002 | Van De Sluis | |
| 2002/0091763 A1 | 7/2002 | Shah et al. | |
| 2002/0129102 A1 | 9/2002 | Landsman et al. | |
| 2002/0165955 A1 | 11/2002 | Johnson et al. | |
| 2003/0065580 A1 | 4/2003 | Obata et al. | |
| 2003/0093485 A1 | 5/2003 | Dougall et al. | |
| 2003/0167257 A1 | 9/2003 | De Bonet | |
| 2003/0167324 A1 | 9/2003 | Farnham et al. | |
| 2004/0093327 A1 | 5/2004 | Anderson et al. | |
| 2004/0148275 A1 | 7/2004 | Achlioptas | |
| 2004/0205165 A1 | 10/2004 | Melamed et al. | |
| 2005/0021387 A1 * | 1/2005 | Gottfurcht | 705/10 |
| 2005/0210000 A1 | 9/2005 | Michard | |
| 2005/0222903 A1 | 10/2005 | Buchheit et al. | |

(Continued)

FOREIGN PATENT DOCUMENTS

EP    822535 A3    10/2000

(Continued)

OTHER PUBLICATIONS

U.S. Appl. No. 11/554,419, filed Oct. 30, 2006, Stephen Tsun.

(Continued)

*Primary Examiner* — James W Myhre
(74) *Attorney, Agent, or Firm* — Fish & Richardson P.C.

(57) ABSTRACT

Methods, systems, and apparatus, including computer programs encoded on a computer storage medium, for consolidating content item request for multiple content item environments. In one aspect, a method includes consolidating content item requests for two or more content item environments in a webpage. A first content item environment is a primary content item environment and the remaining content item environments are secondary content item environments. The primary content item environments issues a content item request for itself and the secondary content item environments, and owns a process that distributes the received content items for the secondary content item environments to the secondary content item environments.

22 Claims, 5 Drawing Sheets

U.S. PATENT DOCUMENTS

| | | | |
|---|---|---|---|
| 2005/0256940 | A1 | 11/2005 | Henderson et al. |
| 2006/0190401 | A1 | 8/2006 | Akadiri |
| 2006/0218304 | A1 | 9/2006 | Mukherjee et al. |
| 2006/0277477 | A1 | 12/2006 | Christenson |
| 2007/0078709 | A1 | 4/2007 | Rajaram |
| 2007/0124200 | A1 | 5/2007 | Simons et al. |
| 2007/0136579 | A1 | 6/2007 | Levy et al. |
| 2007/0192467 | A1 | 8/2007 | Keeler |
| 2008/0104194 | A1 | 5/2008 | Tsun et al. |
| 2009/0024548 | A1 | 1/2009 | Zhu et al. |
| 2010/0115064 | A1 | 5/2010 | Tsun et al. |
| 2011/0295682 | A1* | 12/2011 | Liu .......................... 705/14.48 |

FOREIGN PATENT DOCUMENTS

| | | |
|---|---|---|
| JP | 9222974 A | 8/1997 |
| JP | 2000148675 A | 5/2000 |
| JP | 2003223389 A | 8/2003 |
| JP | 2005267499 A | 9/2005 |
| WO | WO02/15531 A1 | 2/2002 |

OTHER PUBLICATIONS

U.S. Appl. No. 11/554,423, filed Oct. 30, 2006, Tsun et al.

U.S. Appl. No. 11/554,423, filed Oct. 20, 2006, Tsun.

U.S. Appl. No. 11/554,419, filed Oct. 30, 2006, Tsun.

Becta Technical Papers "Web Caches" 2005 [online], [retrieved on Jan. 28, 2008]. Retrieved from the Internet <URL: http://foi.becta.org.uk/content_files/corporate/resources/technology_and_education_research/web_caches.pdf>.

Brattli, T. "Dynamic data using the DOM and Remote Scripting." dhtml central.com. Feb. 21, 2001 (4 pages).

Communication pursuant to Article 94(3) EPC, Application No. EP 07844736.4-2201, dated May 1, 2010, 7 pages.

Supplemental European Search for Application No. EP 07844736.4-2201, dated Dec. 10, 2009, 3 pages.

Fisher & Saksena et al., "Link Prefetching in Mozilla: A Server-Driven Approach*'" Eighth International Workshop on Web Content Caching and Distribution. Sep. 29-Oct. 1, 2003, 6 pages, XP002556392, [online] [retrieved on Nov. 2009] [retrieved from the internet: <URL:http://2003.iwcw.org/papers/fisher.pdf>.

Microsoft, "Microsoft Corporation" Microsfot.com, Oct. 28, 2005 (retrieved by archive.org), 15 pages.

Mohan, C. "Caching Technologies for Web Applications" [online]. Sep. 2001 (31 pages). [retrieved on Jan. 28, 2008]. Retrieved from the Internet: <URL: http://www.almaden.ibm.com/u/mohan/Caching_VLDB2001.pdf.

Nagle, J.. "Congestion Control in IP/TCP Internetworks." Network Working Group [online]. Jan. 6, 1984, pp. 1-9. [retrieved on Jan. 7, 2009]. Retrieved from Internet <http://tools.ietf.org/rfc/rfc896.txt>.

Nagle's algorithm. Wikipedia, the free encyclopedia [online], pp. 1-2 [retrieved on Jan. 7, 2009]. Retrieved from the Internet <http://en.wikipedia.org/wiki/Nagle's_algorithm>.

Padmanabhan, V.N., "Improving World Wide Web Latency*" University of California Report, May 1, 1995, 24 pages, XP002041557.

Sanders, "JavaScript Design," New Riders, Dec. 2001. (Relevant section included), 11 pages.

W3C XHTML TM 2.0 WC3 Working Draft May 6, 2003 [online] [retrieved from the internet on Jun. 28, 2010], http://www.w3.org/TR/2003/WD-xhtm12-20030506, 32 pages.

Xie, X. et al., "Maximizing Information Throughout for Multimedia Browsing on Small Displays" In Multimedia and Expo, 2004, ICME '04. IEEE International Conference, vol. 27-30 Jun. 2004, pp. 2143-2146 vol. 3, [online], [retrieved Jan. 28, 2008]. Retrieved from the Internet: <http://research.microsoft.com/asia/dload_files/group/ims/26.pdf>.

International Search Report and the Written Opinion of the International Searching Authority, PCT/US2011/043999, Feb. 21, 2012, 10 pages.

* cited by examiner

CONSOLIDATED CONTENT ITEM REQUEST FOR MULTIPLE ENVIRONMENTS

BACKGROUND

This specification relates digital information retrieval.

Content displayed on a web page provided by a publisher can included content authored by the publisher and additional content provided by another entity, such as advertisements provide by an advertisement server. The additional content is provided by content item servers in response to content item requests that are generated during the rendering of the web page by a client device. Often a publisher of a web page may define multiple content item environments, e.g., multiple iFrames, for content items to be displayed within a web page. Typically, the client device generates, for each content item environment, an associated content item request, e.g., an advertisement request, that is transmitted to the content item server. For each request, when the client device receives the content items in response to the request, the client device will render the content items in the respective content item environment for which the request was generated.

A web page having multiple content item environments, however, sends multiple requests for content items to the content server. The multiple requests can result in redundant content items being displayed in the different content item environments, which may, in some situations, degrade the user experience. For example, assume the content items are advertisements, and each request has the same or similar request parameters (e.g., the same publisher identifier and keywords). For each request a different advertisement auction is conducted. While each content item environment may display different advertisements within its own environment, some of the advertisements may also be displayed in one or more of the other content item environments, resulting in the display of duplicate advertisements. Accordingly, a suboptimal collection of advertisements may be served for a web page.

Additionally, in the case of advertisements, the running of multiple auction instances for a single instance of a resource is less efficient than running a single auction instance for the resource.

SUMMARY

This specification describes technologies relating to consolidating content item requests for two or more content item environments in a webpage.

In general, one innovative aspect of the subject matter described in this specification can be embodied in methods that include the actions of defining separate content item environments in a web page served by a publisher server, the separate content item environments belonging to a domain of the content server that is different from the domain to which the publisher server belongs, and one of the content item environments being defined as a primary content item environment and each of the other content item environments being defined as secondary content item environments, and each content item environment displays one or more content items received from the content server; generating a primary content item request to the content server for the primary content item environment, the primary content item request being a request for respective content items for display in the primary content item environment and respective content items for display in each of the secondary content item environments; receiving first content item environment instructions in response to the primary content item request and that upon execution cause the client device perform operations comprising: displaying, in the primary content item environment, the respective content items received from the content server for display in the primary content item environment, and providing from the primary content item environment to each secondary content item environment the respective content items for display in the secondary content item environments. Other embodiments of this aspect include corresponding systems, apparatus, and computer programs, configured to perform the actions of the methods, encoded on computer storage devices.

These and other embodiments can each optionally include one or more of the following features. The method includes identifying document object model nodes that include data defining the respective content items for the primary content item environment and rendering the respective content items in the primary content item environment according to style data defining the style by which the respective content items for the primary content item environment are to be displayed; providing from the primary content item environment to each secondary content item environment the respective content items for display in the secondary content item environments comprises, for each secondary content item environment: identifying document object model nodes that include data defining the respective content items for the secondary content item environment, providing the document object model nodes to the secondary content item environment, and rendering the respective content items in the secondary content item environment according to the style data defining the style by which the respective content items for the secondary content item environment are to be displayed.

The style data by which the respective content items for the primary content item environment are to be displayed cause the respective content items for the secondary content item environments to be hidden from display in the primary content item environment. In some implementations, each of the primary content item environment and secondary content item environments are iFrames, and the style data are cascade style sheets. The cascade style sheet by which the respective content items for the primary iFrame are to be displayed cause the respective content items for the secondary iFrames to be hidden from display in the primary iFrame.

Each of the primary iFrame and secondary iFrames have associated content item request variables, and the primary content item request includes the content item request variables for the primary iFrame and the content item request variables for each of the secondary iFrames.

Each of the primary iFrame and secondary iFrames are ordered according to a sequence, the content items are received according to the sequence, and the respective content items for the secondary iFrames are provide from the primary iFrame to each secondary iFrame according to the sequence.

The primary content item request causes the content server to conduct a single instance of an auction for selection of all of the content items that are provided in response to the primary content item request. In some implementations, the content items are advertisements.

Another innovative aspect of the subject matter described in this specification can be embodied in methods that include the actions of defining separate iFrames in a web page served by a publisher server, the separate iFrames belonging to a domain of the content server that is different from a domain to which the publisher server belongs, and one of the iFrames being a primary iFrame and each of the other iFrames being secondary iFrames, and iFrame for displaying one or more content items received from the content server; generating a primary content item request to the content server for the primary iFrame, the primary content item request being a request for respective content items for display in the primary iFrame and respective content items for display in each of the secondary iFrames; generating, for each secondary iFrame, a secondary content item request to the content server to initialize each secondary iFrame to the domain of the content server; receiving first content item environment instructions in response to the primary content item request and second content item environment instructions in response to each secondary content time request and that upon execution cause the client device perform operations comprising: displaying, in the primary iFrame, the respective content items received from the content server for display in the primary iFrame, and providing, from the primary iFrame to each secondary iFrame, the respective content items for display in the secondary iFrames. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Conducting a single instance of an auction for all content item environments in a resource reduces resource requirements of the content item server. Additionally, the single auction instance ensures that each content item in a set of content items served in response to the request is unique within the set.

In the case of the content items being advertisements, the set of unique content items reduces advertisement blindness and avoids inefficient allocation of advertiser budgets. Because all of the content items are received in response to a single request, there is no latency in receiving content items for separate content item environments. Accordingly, the content items in the content item environments appear to be rendered simultaneously, resulting in a smooth rendering of the resource on the client device, which, in turn, enriches the user experience.

Client side instructions, either alone or in cooperation with instructions provided by a content item server, can allow flexibility in choosing which content item environments particular content items are placed. The performance of each content item environment with respect to an evaluation parameter, e.g., revenue, click-through rate, etc., can be tracked and future content item placements in the content item environments can be adjusted based on the performance.

Additionally, with only one auction request for a resource having multiple content item environments, the auction can be conducted in a stateless manner and still select a set of content items that will not have a duplicate display in two or more content item environments. Thus, the auction server need not correlate multiple requests with a single instance of a page display, and need not track and filter the content items that are selected for each request to avoid duplicate display of content items.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

This specification describes technologies relating to consolidating content item requests for two or more content item environments in a webpage. A first content item environment is a primary content item environment and the remaining content item environments are secondary content item environments. The primary content item environment issues a content item request for itself and the secondary content item environments and owns a process that distributes the received content items for the secondary content item environments to the secondary content item environments.

The use case of advertisement content items and iFrame content item environments is provided as an illustrative example. Other implementations can also be realized, however. For example, instead of the processing of advertisement content items, content items such as non-commercial videos, images, RSS feeds, etc., can be processed in the same manner that the advertisement content items are processed. Likewise, instead of iFrames within an existing web page, other content item environments, such as pop-up windows, can be used.

§1.1 Example Environment

Figure 1:
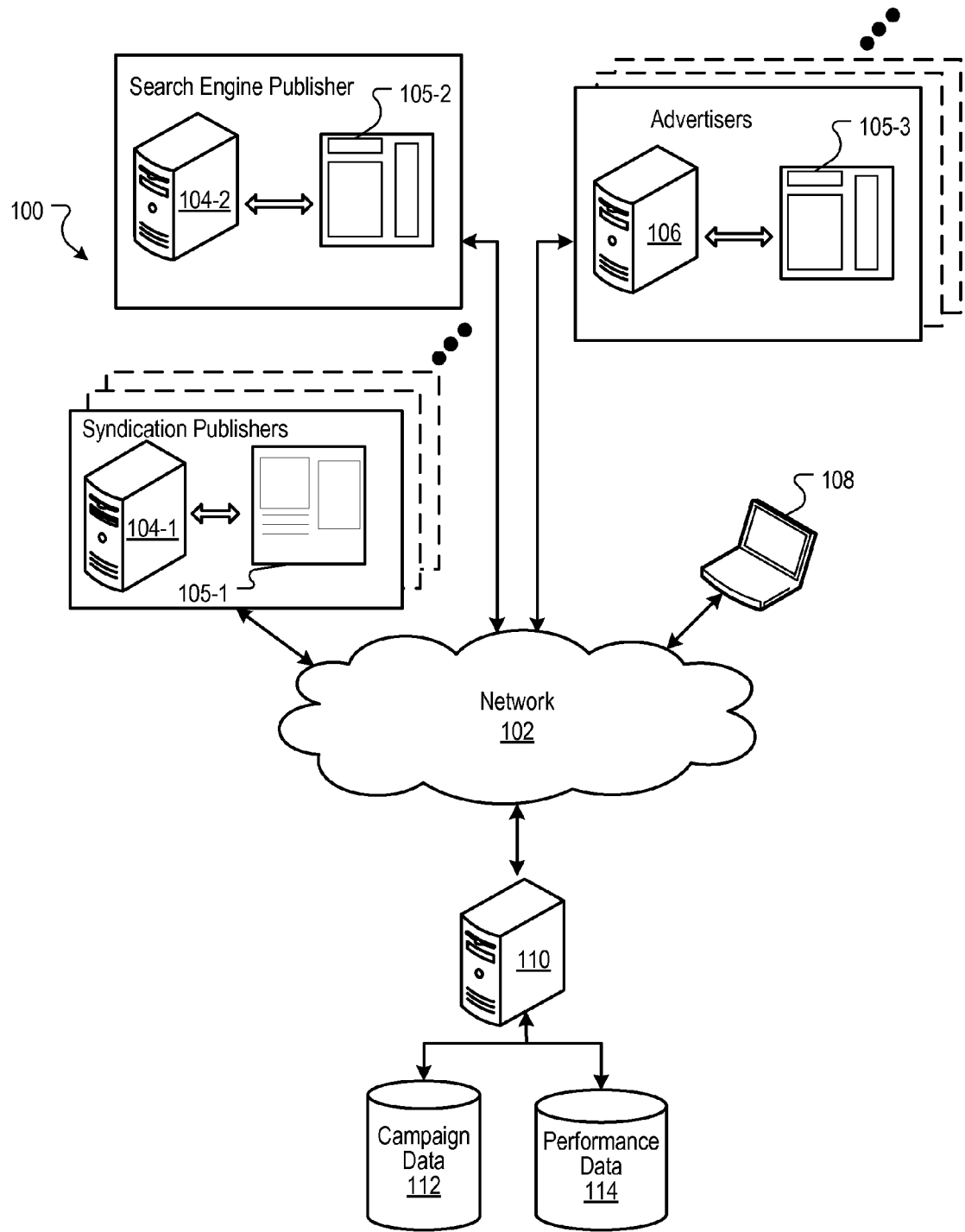
FIG. 1 is a block diagram of an example environment in which content items are provided to a user device.

FIG. 1 is a block diagram of an example environment in which content items are provided to user devices. A computer network 102, such the Internet, or a combination of the Internet and one or more wired and wireless networks, connects syndication publishers 104-1, a search engine publisher 104-2, advertisers 106, a user device 108, and an advertisement management system 110. Only one representative entity is respectively shown for the syndication publisher 104-1 and the advertiser 106. However, the online environment 100 connects many thousands of publishers and advertisers, as indicated by the phantom figures behind the syndication publisher 104-1 and the advertiser 106.

The user device 108 is an electronic device that is under control of a user and is capable of requesting and receiving resources 105 over the network 102. Example user devices 108 include personal computers, mobile communication devices and other devices that can send and receive data over the network 102. A user device 108 typically includes a user application, such as a web browser or other communication software, to facilitate the sending and receiving of data over the network 102.

The publishers 104 and, optionally, the advertisers 106 maintain websites. Each website is one or more resource 105 associated with a domain name, and each is hosted by one or more servers. A resource is any data that can be provided by the web site over the network 102 and that is associated with a resource address. Resources include HTML pages, RSS feeds, and video, for example. To avoid congestion in the drawings, the resources 105 are represented as web pages;

however, the representations of FIG. 1 are inclusive of all types of resources that are consistent with the above definition.

As will be described in more detail below, each of the publishers 104 are in data communication with the advertisement management system 110 and together the publishers 104 and the advertisement management system 110 facilitate the provisioning of advertisements with the publisher resources 105-1 or 105-2. In particular, the advertisement management system 110 allows advertisers to define targeting rules that take into account attributes of the particular user to provide targeted advertisements for the users.

These targeted advertisements can be provided in many different properties, such as the properties of the syndication publisher 104-1 and the search engine publisher 104-2. The syndication publisher 104-1 is a general content web site, e.g., a sports related web site, a news related web site, a social network web site, etc. When a user device 108 receives a resource 105-1 from the syndication publisher 104-1, the user device renders the webpage 105-1. The webpage 105-1 includes instructions that cause the user device to request advertisements from the advertisement management system 110. The advertisement management system 110, in turn, provides targeted advertisements to the particular user. When a user selects an advertisement, the user device 108 generates a request for a landing page of the advertisement, which is typically a webpage 105-3 of the advertiser 106.

The search engine publisher 104-2 is a search service that provides advertisements to users with search results that are responsive to user queries. Typically, the search results are provided in one part of the page, such as the left-hand side, and the advertisements are provided in another part of the page, such as the right-hand side of the page. When the search engine publisher 104-2 provides the search results webpage 105-2 to the user device 108, the user device renders the webpage 105-2. The webpage 105-2 includes instructions that cause the user device to request advertisements from the advertisement management system 110. The advertisement management system 110, in turn, provides targeted advertisements to the particular user.

The advertisement management system 110 includes a data storage system that stores campaign data 112 and performance data 114. The campaign data 112 stores advertisements, targeting information, and budgeting information for advertisers 106. The performance data 114 stores data indicating the performance of the advertisements that are served. Such performance data can include, for example, click through rates for advertisements, the number of impressions for advertisements, and the number of conversions for advertisements. Other performance data can also be stored, such as data indicating, for each resource, the content item environments in which advertisements were selected for each display instance of the resource.

The campaign data 112 and the performance data 114 are used as input parameters to an advertisement auction. In particular, the advertisement management system 110, in response to each request for advertisements, conducts an auction to select advertisements that are provided in response to the request. The advertisements are ranked according to a score that, in some implementations, is proportional to a value based on an advertisement bid and one or more parameters specified in the performance data 114.

§2.0 Processing of Content Item Requests

Figure 2:
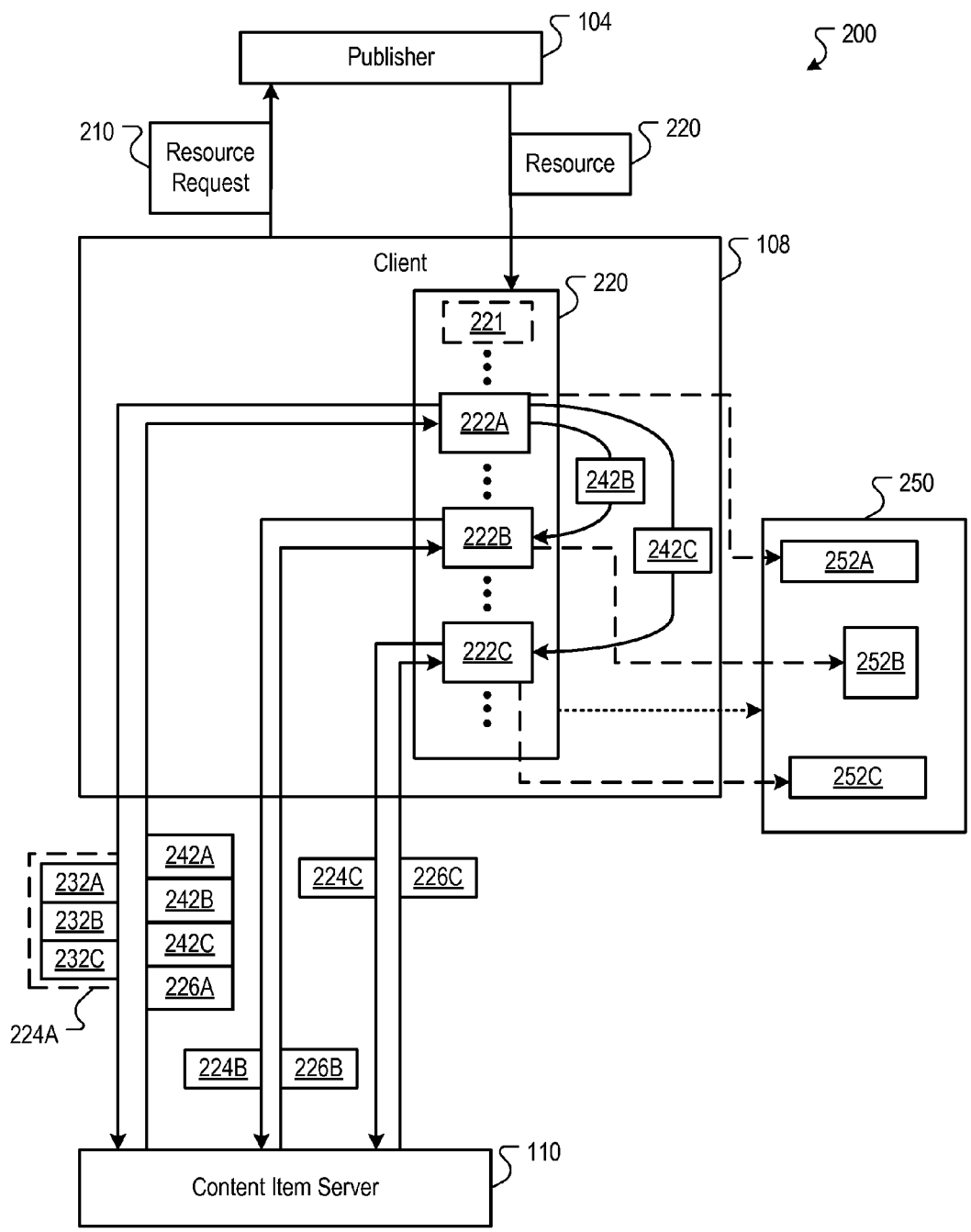
FIG. 2 is a block diagram illustrating a process flow between a publisher server, a client device, and a content item server.

A more detailed description of the processing of content item requests is described with reference to FIG. 2, which is a block diagram 200 illustrating a process flow between the publisher server 104 (e.g., a syndication publisher 104-1 or search engine publisher 104-2), a client device 108, and a content item server 110 (e.g., one or more servers of the advertisement management system 110).

In operation, the client device 108 sends a resource request 210 to the publisher 105. An example resource request 210 is an HTTP request for a web page. In response, the publisher 105 provides the requested resource 220 the client device 108. The resource 220 includes, for example, hypertext markup language (HTML), scripts, and other instructions that, when executed by the client device, cause a client device to perform operations.

Within the resource 220 are content item environment instructions 222A, 222B and 222C that render content items in the separate content item environments 252A, 252B and 252C in the displayed web page 250, and perform intra-domain passing of content items from the primary content item environment to the secondary content item environments. In some implementations, the instructions 222 are provided by the publisher and include all instructions necessary to perform the operations described below.

In other implementations, the web page 220 can be provided content item environment definition instructions 221 that cause the client device to request the instructions 222 (either from the content server 110 or the publisher 104, depending on the implementation) when the web page 220 is being rendered. For example, the content item server 110 may provide the publisher with a first script that the publisher includes in its web page source code, and the publisher may define the number of content item environments and the number of content items in each environment it desires for the web page. When rendering the web page 220, the client device executes the first script, which causes the client device to request the definition instructions 221 from the content item server 110. The instructions 221, once received at the client device and executed, cause the client device to instantiate the content item environments 252, and request the environment instructions 222 for each of the content item environments.

The two example methods for provisioning instructions described above are illustrative only, and other techniques can also be used.

The separate content item environments belong to a domain of the content server 110, and this domain is different from the domain to which the publisher 105 belongs. The domain is, for example, defined by the request. For example, for a communication in which the domain protocol, host and port are "http", "www.example.com" and "80", respectively, the domain would be identified by http://www.example.com. As used in this specification, a content item environment "belongs" to a particular domain when it has administrative authority for that domain. For example, in a browser environment, the web page 220 belongs to the domain on the publisher, while the content item environments 252 within the web page belong to the domain of the content server.

Same-domain content item environments can programmatically communicate, but such communications are not readily facilitated between cross-domain content item environments. Because the content item environments are in the same domain as the content item server 110 and do not belong to the domain of the publisher, the publisher processes do not have administrative authority for the content item environments. Thus the processes of the publisher 105 cannot alter the internal state of the content item environments. This realizes a security measure that makes it more difficult for a publisher or an intervening third party to implement abusive processes (e.g., spamming, false impression reporting) within the content item environments.

By way of example, each of the content item environments can be implemented as iFrames that belong to the domain of the content item server 110. This allows for rendering of content items within the content item environments asynchronously from the rendering of the remaining content of the webpage 220. Thus, if there is a high latency in serving a content item request for the content item environments, the latency will not preclude the rendering of the other content within the webpage 220.

One of the content item environments is a primary content item environment (e.g., content item environment 252A) and each of the other content item environments are secondary content item environments (e.g., content item environments 252B and 252C). As used herein, a primary content item environment is a content item environment that issues a content item request for itself and for one or more other secondary content item environments, and provides the content items received in response to its request to the secondary content item environments. Similarly, a secondary content item environment is a content item environment that receives its respective content items for rendering from its associated primary content item environment.

A particular content item environment can be pre-defined as a primary content item environment or one of the content item environments can be selected automatically. In the case of the former, the publisher 104 may, for example, specify in the source of the resource which content item environment is the primary content item environment. In the case of the latter, the instructions 221 may, for example, define the first content item environment that is identified during processing as the primary content item environment. Other ways of defining a primary content item environment can also be used, e.g., the first content item environment that will be rendered may be defined as the primary content item environment.

In operation, the client device 108, executing the instructions 221 of the webpage 220, generates a primary content item request 224A to the content server 110 to initialize the primary content item environment. In some implementations, to initialize each secondary content item environment to the domain of the primary content item environment, the client device also generates for each secondary content item environment a secondary content item request, e.g., requests 224B and 224C.

The primary and secondary content item requests are sent to the content item server 110. The primary content item request 224A is a request for respective content items for display in the primary content item environment 252A and respective content items for display in each of the secondary content item environments 252B and 252C. For example, each of the primary content item environment and secondary content item environments have associated content item request variables (e.g., 232A, 232B and 232C), and the primary content item request 224A includes the content item request variables for the primary content item environment (232A) and the content item request variables for each of the secondary content item environments (232B and 232C). The example request variables include a publisher identifier that identifies the publisher 105, one or more keywords (e.g., search terms input by user or keywords extracted from the page of the publisher), a content item environment identifier that identifies which content item environment the variables correspond to, and the number of content items requested for the content item environment. More or fewer variables can be used in the request.

In response to the primary content item request, the content item server selects advertisements (described below), and provides the advertisements along with instructions 222A for rendering the advertisements in the primary content item environments 252A, and, optionally, style data 226A defining a style by which the respective content items are to be displayed. For example, in the case of iFrames, a cascade style sheet is provided.

Each secondary content item environment requests includes a "no operation" common gateway interface argument that indicates that no content items are requested for the content item request. In some implementations, in response to secondary content item environment request, instructions 222 (e.g., 222B and 222C) are received for each secondary content item environment, and, optionally style data (e.g., style data 226B and 226C) defining the style by which the respective content items for the secondary content item environment are to be displayed.

In some implementations, the instructions 222A, 222B and 222C are duplicate sets of instructions, e.g., a particular JavaScript received for each iFrame. The operations performed by the client device are dependent on the type of content item environment (e.g., primary or secondary) for which the instructions 222 are being executed.

To select content items in response to the primary content item request 224A, the content item server 110 conducts an auction. In some implementations, the content item server 110 conducts a single instance of an auction for selection of all of the content items that are provided in response to the primary content item request 224A. For example, if two advertisements are requested for the primary content item environment 252A, and three advertisements are requested for each of the secondary content item environments 252B and 252C, then the single instance of the auction will select eight advertisements in response to the request.

In other implementations, the content item server 110 conducts separate auctions for each of the content item environments. For example, the content item server 110 can parse the variables included in the primary content item request 224A, and conduct three instances of the auction, a first instance for the primary content item environment 252A, a second instance for the secondary content environment 252B, and a third instance for the secondary content item environment 252C.

The content items that the content item server 110 selects can, in some implementations, be ordered according to a sequence. For example, each of the primary content item environment 252A and secondary content item environments 252B and 252C are ordered according to a sequence defined by the content item environment identifier of each content item environment. In turn, the content items are received according to the sequence, and the respective content items for the secondary content item environments are provide from the primary content item environment to each secondary content item environment according to the sequence. Thus, assuming the primary content item environment 252A is first in the sequence, and the secondary content item environments 252B and 252C are second and third in the sequence, then the respective content items 242A, 242B and 242C are received according to this sequence. Continuing with the example above, the content items 242A are the two advertisements for the primary content item environment 252A; the content items 242B are the three advertisements for the secondary content item environment 252B; and the content items 242C are the three advertisements for the secondary content item environment 252C. Accordingly, a sequence of eight advertisements is received, the first two of which are to be rendered in the primary content item environment 252A, the next three of which are to be rendered in the secondary content item environment 252B, and the last three of which are to be rendered in the secondary content item environment 252C.

In some implementations, each content item environment can include instructions that report performance data to the content item server 110. For example, if an advertisement in a content item environment is selected, the client device, executing the instructions, sends data to the content item server 110 indicating the advertisement that was selected and the content item environment in which it was selected. Over time these data are aggregated and stored in the performance data store 114, and the aggregated data are accessed when selecting advertisements. The advertisements can be ordered in a sequence such that the advertisements that are the highest performing relative to the other selected advertisements (e.g., advertisements with the highest click through rates) are provided in the content item environment in which the advertisements are most often selected. The instructions 222, either alone or in cooperation instructions provided by the content item server, can be configured to cause the client device to report the performance data and order the advertisements accordingly.

Returning to the above example, assume that the secondary content item environment 252B is the highest performing content item environment of the three environments 252A, 252B, and 252C, that each of the eight advertisements can be shown in any the environments 252A, 252B, and 252C, and that the eight advertisements that are received are ordered according to the click through rates, e.g., A1-A2-A3-A4-A5-A6-A7-A8. Accordingly, the first three advertisements would be shown in the content item environment 252B. For example, each advertisement may be tagged with the corresponding content item environment in which it is to be shown.

Alternatively, the content item server 110 can provide the advertisements in the order as determined by the ordering of the content item environments. For example, to show advertisements A1, A2 and A3 in the second content item environment, the order could be A4-A5-A1-A2-A3-A6-A7-A8. The instructions 222 then process the advertisements so that the first two advertisements, A4 and A5, are shown in the environment 252A, and the next three advertisements A1, A2 and A3 are shown in the environment 252B, and the last three advertisements A6, A7 and A8, are shown in the environment 252C.

Other techniques of dynamically distributing the content items to respective content item environments can also be used.

After the content item environments are initialized and the respective content items are received from the content item server 110, the respective content items for the primary content item environment 252A are displayed in the primary content item environment 252A. Additionally, a process of the primary content item environment 252A, define by the instructions 222A, provides to each secondary content item environment 252B and 252C the respective content items 242B and 242C for display in the secondary content item environments.

In some implementations, the content items are displayed according to the style data associated with the content item environments. For example, each content item environment will render the content items it receives, e.g., the instructions 222A for the primary content item environment 252A will render all content items received from the content item server 110, and the instructions 222B and 222C for each secondary content item environment 252B and 252C will render the content items 242B and 242C that are respectively received from the primary content item environment 252A. The style data, however, requires that the content items 242B and 242C be hidden when rendered in the primary content item environment 252A. Accordingly, after the content items 242 are initially received, only the content items 242A are shown in the primary content item environment 252A.

To provide the content items 242B and 242C to the secondary content item environments 252B and 252C, in some implementations, the instructions 222A, when executed by the client device 108, cause the client device 108 to identify document object model nodes that include data defining the respective content items 242B and 242C. The client device 108 then provides the respective data to the corresponding secondary content item environments. Each secondary content item environment 252B and 252C thereafter renders the respective content items in the secondary content item environment according to its associated style data and instructions 222B and 222C.

§2.1 Example Implementation

An example implementation uses JavaScript instructions (e.g., instructions 221 and 222) to define each content item environment. Type arguments that the JavaScript instructions receive define the respective content item environments as either a primary content item environment or secondary content item environment, e.g., a primary iFrame or secondary iFrame. The JavaScript makes a primary content item request to the content item server 110 which includes variables for the primary iFrame and respective variables for each of the secondary iFrames, e.g., Content.request(vars1, vars2, vars3)

where vars1 are variables for a primary iFrame and vars 2 and vars 3 are respective variables for two respective secondary iFrames. The JavaScript also makes the secondary content item requests for each of the secondary iFrames.

In some implementations, variables that define the number of ads in the format of the advertisements for each of the primary and secondary iFrames can be provided in a sequential format. For example, assume that the primary iFrame requires two advertisements of a narrow format, and each of the secondary iFrames requires three advertisements of a wide format. An exampled sequential format that conveys the request is "n2|w3|w3". When responding to the request, the content item server 110 provides the advertisements in the sequence defined by the sequential format, i.e., the first two advertisements are advertisements in the narrow format for the primary iFrame, the next six advertisements are advertisements in a wide format, the first three of which are for the first secondary iFrame, and the last three of which are for the second secondary iFrame.

When the advertisements are received, they are initially rendered in the primary iFrame according to the instructions for the iFrame (e.g., instructions 222A) and style data. For example, a cascade style sheet associated with the primary iFrame causes the primary iFrame to hide all advertisements for the secondary iFrames. Accordingly, only the first two advertisements are displayed in the primary iFrame. By execution of the JavaScript associated with the primary iFrame (e.g., instructions 222A), the client device then provides the respective advertisements to each of the secondary iFrames from the primary iFrame.

For example, the primary iFrame identifies the respective DOM nodes that include the advertisements for each of the secondary iFrames. For the primary iFrame to provide the advertisements to the secondary iFrames for rendering, it accesses the parent window object of the iFrames, references a specific secondary iFrame, and calls a method on it, passing in the advertisement DOM nodes as a parameter, e.g., window.parent.frame[#].loadContent(DOMnodes), where # is the content item environment identifier of the secondary iFrame;

DOMnodes are the DOM nodes to be sent to the secondary iFrame;

loadContent(DOMnodes) is a script of the secondary iFrame that renders the passed content items in the secondary iFrame (e.g., instructions 222B, 222C)).

In some implementations, after the DOM nodes are passed to the secondary iFrames, the DOM nodes are removed from the primary iFrame by a process defined by the instructions 222A.

Other implementations can also be used. For example, each secondary iFrame can request a specific number of advertisements from the primary iFrame after the primary iFrame receives the advertisements from the content item server. In response, the primary iFrame can pass the requested number of advertisements to the secondary iFrames.

§3.0 Example Process Flows

Figure 3:
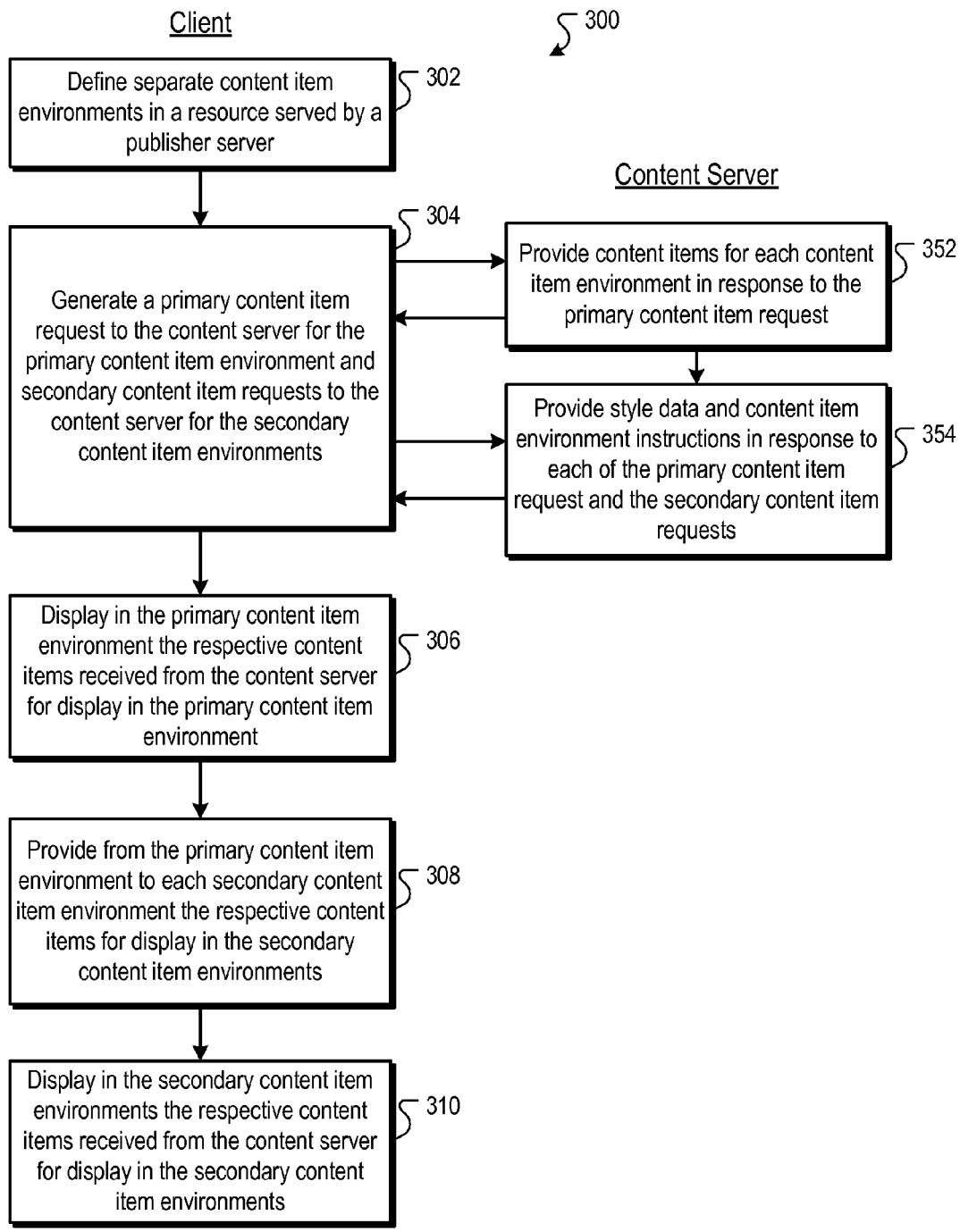
FIG. 3 is a flow diagram of an example process for a consolidated content item request for multiple content item environments.

FIG. 3 is a flow diagram 300 of an example process for a consolidated content item request for multiple content item environments. Portions of the example process 300 are performed the client device, and other portions are performed in the content server, as indicated by the "Client" and "Content Server" headings. The process steps are performed in response to a client device and the content server executing respective programming instructions.

The client device defines separate content item environments in a resource served by a publisher server (302). In some implementations, the separate content item environments belong to a domain of the content server that is different from the domain to which the publisher server belongs. One of the content item environments is a primary content item environment and each of the other content item environments are secondary content item environments, and each content item environment displays one or more content items received from the content server. An example content item environment is an iFrame, and an example content item is an advertisement.

The client device generates a primary content item request to the content server for the primary content item environment and secondary content item requests to the content server for the secondary content item environments (304). In some implementations, the primary content item request is a request for respective content items for display in the primary content item environment and respective content items for display in each of the secondary content item environments. The secondary content item requests are used to initialize the secondary content item environments to the same domain the primary content item environment.

The content server provides content items for each content item environment in response to the primary content item request (352). For example, the content item server can run a single instance of an auction to select all of the content items responsive to the primary content item request.

The content server provides style data and content item environment instructions in response to each of the primary content item request and the secondary content item requests (354). For example, in the case of iFrames, the content server can provide cascade style sheets for formatting the advertisements when they are rendered in the iFrames, and instructions for each iFrame for passing the content items from the primary iFrame to the secondary iFrames and for rendering the content items in each iFrame.

The client device displays in the primary content item environment the respective content items received from the content server for display in the primary content item environment (306). For example, the primary iFrame will render the advertisements that are requested for the primary iFrame, e.g., all of advertisements received from the content item server 110. However, the cascade style sheet associate with the primary iFrame will cause the advertisements that are to be provided to the secondary iFrames to be hidden from display.

The client device provides from the primary content item environment to each secondary content item environment the respective content items for display in the secondary content item environments (308). For example, the primary iFrame will provide respective advertisements to each of the secondary iFrames by accessing a parent window object of the iFrames. For the primary iFrame to provide the advertisements to the secondary iFrames for rendering, it accesses the parent window object of the iFrames, references a specific secondary iFrame, and calls a method on it, passing in the advertisement DOM nodes as a parameter (e.g., window.parent.frame[#].loadContent(DOMnodes)).

The client device displays in the secondary content item environments the respective content items received from the content server for display the secondary content item environments (310). For example, after the advertisements are provided to their respective secondary iFrames, the secondary iFrames render the advertisements for display.

Figure 4:
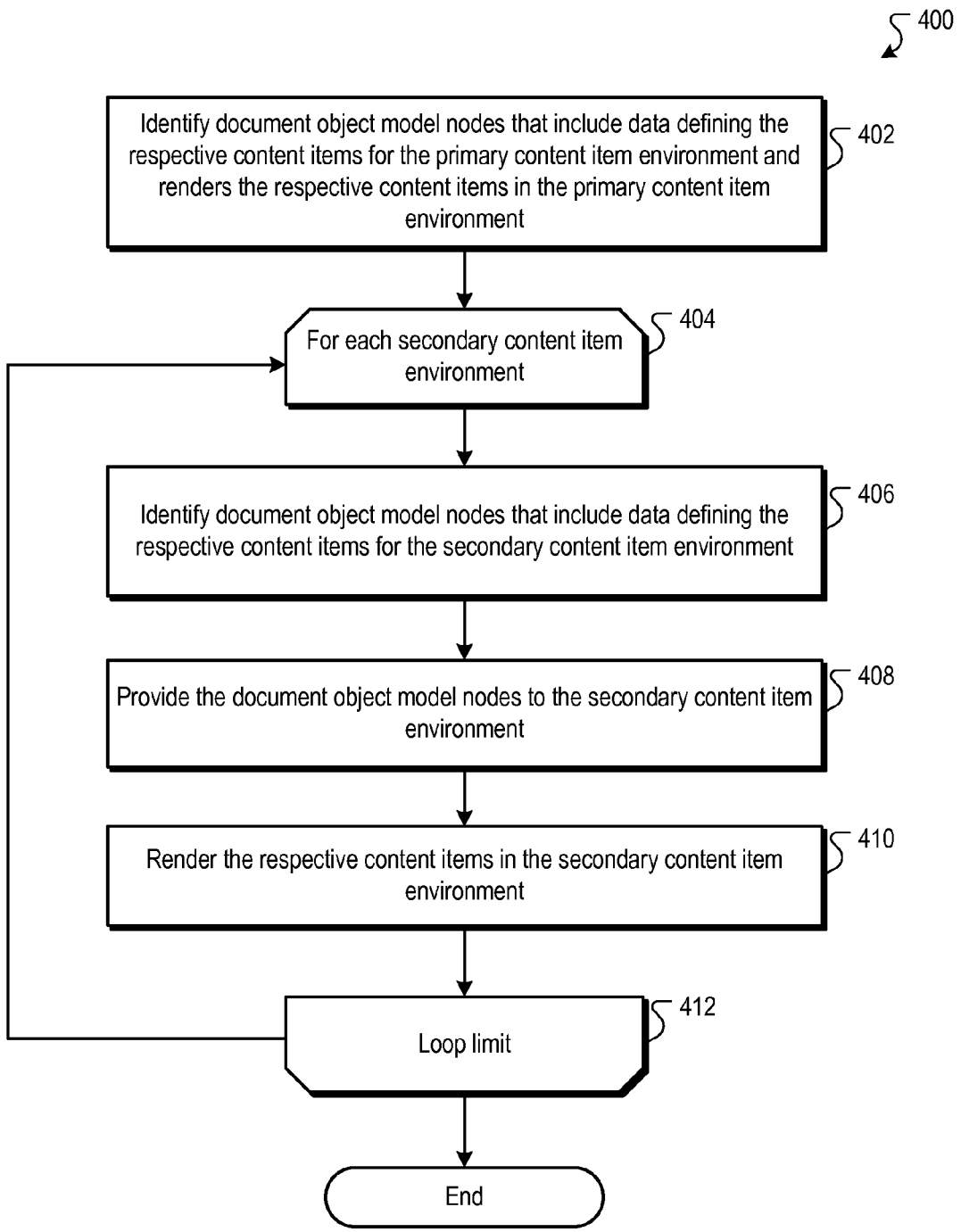
FIG. 4 is a flow diagram of an example process for providing content items from a primary content item environment to secondary content item environments.

FIG. 4 is a flow diagram 400 of an example process for providing content items from a primary content item environment to secondary content item environments. The example process 400 is performed in a client device executing instructions 222 for the respective content item environments.

The client device identifies document object model nodes that include data defining the respective content items for the primary content item environment and renders the respective content items in the primary content item environment (402). As described above, the advertisements are provided in an order according to the sequence of the iFrames. Accordingly, the primary iFrame will determine its sequence within the iFrames, and will identifies corresponding DOM nodes that contain its advertisements. These advertisements will be displayed, while all other advertisements will be hidden from view, as required by the cascade style sheets associated with the primary iFrame.

The client device, for each secondary content item environment (404), identifies document object model nodes that include data defining the respective content items for the secondary content item environment (406). For example, for each secondary iFrame, the primary iFrame will determine its sequence within the iFrames, and will identify the corresponding DOM nodes for that secondary iFrame.

The client device provides the document object model nodes to the secondary content item environment (408), and renders the respective content items in the secondary content item environment (410). For example, by accessing the parent window object of the iFrames, the primary iFrame can pass the DOM nodes to the secondary iFrame, and the secondary iFrame will render the corresponding advertisements for display.

If all secondary content item environments are processed, then the loop limit (412) is achieved, and the process 400 ends. Otherwise, the process continues for the next secondary content item environment (404).

§4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
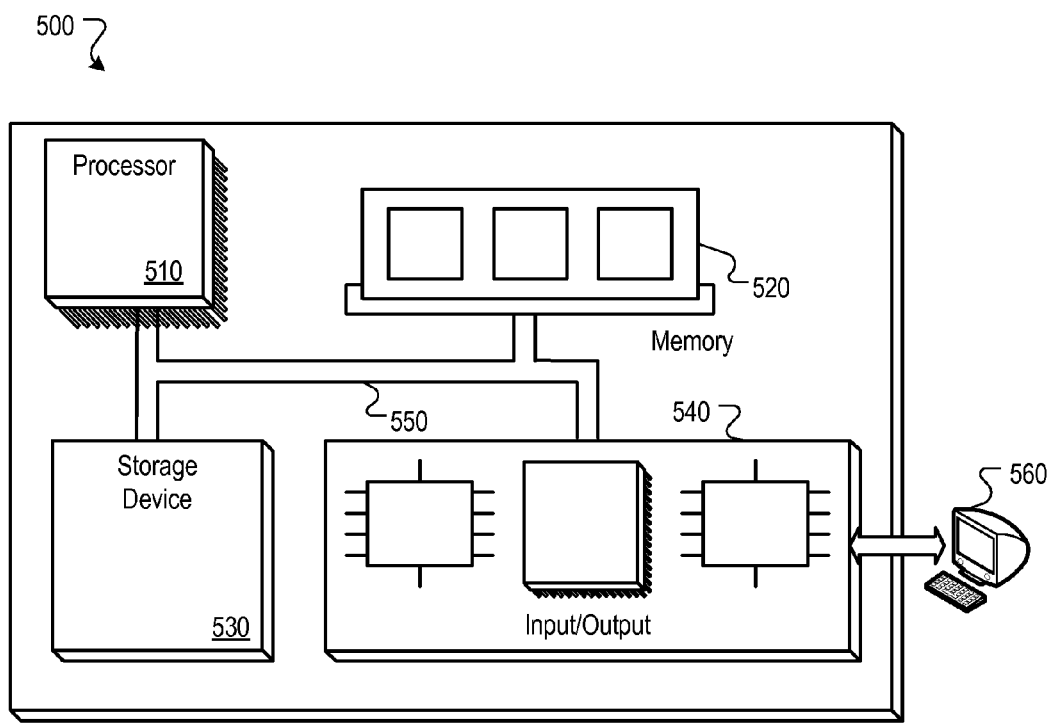
FIG. 5 is a block diagram of a programmable processing system.

An example of one such type of computer is shown in FIG. 5, which shows a block diagram of a programmable processing system (system). The system 500 that can be utilized to implement the systems and methods described herein. The architecture of the system 500 can, for example, be used to implement a computer client, a computer server, or some other computer device.

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer storage medium encoded with instructions that when executed by a client device cause the client device to request content items from a content server and process the content items upon receipt, the instructions comprising:
    content item environment definition instructions for a web page, the web page including publisher content provided by the publisher, the publisher content for display in the web page, and that upon execution cause the client device perform operations comprising:
    instantiating separate content item environments in the web page served by a publisher server, each separate content item environment being an environment in which to display content items provided by a content server that is different from the publisher server, the separate content item environments belonging to a domain of the content server that is different from the domain to which the publisher server belongs, and one of the content item environments being defined as a primary content item environment and each of the other content item environments being defined as secondary content item environments, and each content item environment displays one or more of the content items received from the content server;
    generating a primary content item request to the content server for the primary content item environment, the primary content item request being a request for respective first content items for display in the primary content item environment and, for each secondary content item environment, respective second content items for display in each of the secondary content item environments;
    receiving, from the content server, the respective first and second content items, and first content item environment instructions in response to the primary content item request, wherein the first content item environment instructions upon execution cause the client device perform operations comprising:
    displaying, in the primary content item environment, the respective first content items received from the content server for display in the primary content item environment; and
    providing from the primary content item environment to each secondary content item environment the respective second content items for display in the secondary content item environments.

2. The computer storage medium of claim 1, wherein the content item environment instructions upon execution cause the client device to perform operations comprising for each secondary content item environment:
    generating a secondary content item request for the secondary content item environment; and
    receiving from the content server in response to the secondary content item request style data defining a style by which the respective second content items for the secondary content item environment are to be displayed and second content item environment instructions that upon execution cause the client device perform operations comprising displaying the respective second content items provided to the secondary content item environment according to the style data; and wherein the client device also receives style data defining a style by which the respective first content items for the primary content item environment are to be displayed.

3. The computer storage medium of claim 2, wherein:
displaying, in the primary content item environment, the respective first content items received from the content server for display in the primary content item environment comprises identifying document object model nodes that include data defining the respective first content items for the primary content item environment and rendering the respective first content items in the primary content item environment according to the style data defining the style by which the respective first content items for the primary content item environment are to be displayed;
providing from the primary content item environment to each secondary content item environment the respective second content items for display in the secondary content item environments comprises, for each secondary content item environment:
identifying document object model nodes that include data defining the respective second content items for the secondary content item environment;
providing the document object model nodes to the secondary content item environment; and
rendering the respective second content items in the secondary content item environment according to the style data defining the style by which the respective second content items for the secondary content item environment are to be displayed.

4. The computer storage medium of claim 3, wherein the style data by which the respective first content items for the primary content item environment are to be displayed cause the respective second content items for the secondary content item environments to be hidden from display in the primary content item environment.

5. The computer storage medium of claim 4, wherein each of the primary content item environment and secondary content item environments are iFrames.

6. The computer storage medium of claim 1, wherein each of the primary content item environment and secondary content item environments have associated content item request variables, and wherein the primary content item request includes the content item request variables for the primary content item environment and the content item request variables for each of the secondary content item environments.

7. The computer storage medium of claim 1, wherein each of the primary content item environment and secondary content item environments are ordered according to a sequence, the respective first and second content items are received according to the sequence, and the respective second content items for the secondary content item environments are provide from the primary content item environment to each secondary content item environment according to the sequence.

8. The computer storage medium of claim 1, wherein each of the primary content item environment and secondary content item environments are iFrames, and each respective first and second content item is an advertisement.

9. The computer storage medium of claim 1, wherein the primary content item request causes the content server to conduct a single instance of an auction for selection of all of the respective first and second content items that are provided in response to the primary content item request.

10. A computer storage medium encoded with instructions that when executed by a client device cause the client device to request content items from a content server and process the content items upon receipt, the instructions comprising:
content item environment definitions instructions for a web page, the web page including publisher content provided by the publisher, the publisher content for display in the web page, and that upon execution cause the client device perform operations comprising:
instantiating separate iFrames in the web page served by a publisher server, each separate iFrame being an environment in which to display content items provided by a content server that is different from the publisher server, the separate iFrames belonging to a domain of the content server that is different from a domain to which the publisher server belongs, and one of the iFrames being a primary iFrame and each of the other iFrames being secondary iFrames, and iFrame for displaying one or more of the content items received from the content server;
generating a primary content item request to the content server for the primary iFrame, the primary content item request being a request for respective first content items for display in the primary iFrame and respective second content items for display in each of the secondary iFrames;
generating, for each secondary iFrame, a second content item request to the content server to initialize each secondary iFrame to the domain of the content server;
receiving, from the content server, the respective first and second content items, and first content item environment instructions in response to the primary content item request and second content item environment instructions in response to each secondary content item request and that upon execution cause the client device perform operations comprising:
displaying, in the primary iFrame, the respective first content items received from the content server for display in the primary iFrame; and
providing, from the primary iFrame to each secondary iFrame, the respective second content items for display in the secondary iFrames.

11. The computer storage medium of claim 10, wherein each secondary iFrame receives, in response to its respective request, cascade style sheet data defining a style by which the respective second content items for the secondary content item environment are to be displayed.

12. The computer storage medium of claim 11, wherein:
displaying, in the primary iFrame, the respective first content items received from the content server for display in the primary iFrame comprises identifying document object model nodes that include data defining the respective first content items for the primary iFrame and rendering the respective first content items in the primary iFrame according to the cascade style sheet defining the style by which the respective first content items for the primary iFrame are to be displayed;
providing, from the primary iFrame to each secondary iFrame, the respective second content items for display in the secondary iFrames comprises, for each secondary iFrame:
identifying document object model nodes that include data defining the respective second content items for the secondary iFrame;
providing the document object model nodes to the secondary iFrame; and
rendering the respective second content items in the secondary iFrame according to the cascade style sheet defining the style by which the respective second content items for the secondary iFrame are to be displayed.

13. The computer storage medium of claim 12, wherein the cascade style sheet by which the respective content items for the primary iFrame are to be displayed cause the respective second content items for the secondary iFrames to be hidden from display in the primary iFrame.

14. The computer storage medium of claim 12, wherein each of the primary iFrame and secondary iFrames have associated content item request variables, and wherein the primary content item request includes the content item request variables for the primary iFrame and the content item request variables for each of the secondary iFrames.

15. The computer storage medium of claim 11, wherein each of the primary iFrame and secondary iFrames are ordered according to a sequence, the respective first and second content items are received according to the sequence, and the respective second content items for the secondary iFrames are provide from the primary iFrame to each secondary iFrame according to the sequence.

16. The computer storage medium of claim 10, wherein each content item of the first and second content items is an advertisement.

17. The computer storage medium of claim 10, wherein the primary content item request causes the content server to conduct a single instance of an auction for selection of all of the first and second content items that are provided in response to the primary content item request.

18. A method performed by a client device, the method comprising:
   requesting, at a client device, a web page from a publisher server, the web page including publisher content provided by the publisher, the publisher content for display in the web page, and including instructions defining separate content item environments in which to display content items provided by a content server that is different from the publisher server;
   receiving, at the client device, the web page;
   instantiating, by the client device, separate content item environments in the web page served by the publisher server, the separate content item environments belonging to a domain of the content server that is different from the domain to which the publisher server belongs, and one of the content item environments being a primary content item environment and each of the other content item environments being secondary content item environments, and each content item environment for displaying one or more of the content items received from the content server;
   generating, by the client device, a primary content item request to the content server for the primary content item environment, the primary content item request being a request for respective first content items for display in the primary content item environment and, for each secondary content item environment, respective second content items for display in each of the secondary content item environments;
   receiving, from the content server, the respective first and second content items;
   displaying, by the client device in the primary content item environment, the respective first content items received from the content server for display in the primary content item environment; and
   providing from the primary content item environment to each secondary content item environment the respective second content items for display in the secondary content item environments.

19. A method performed by a client device, the method comprising:
   requesting, at a client device, a web page from a publisher server, the web page including publisher content provided by the publisher, the publisher content for display in the web page, and including instructions for defining separate iFrames in which to display content items provided by a content server that is different from the publisher server;
   receiving, at the client device, the web page;
   instantiating separate iFrames in the web page served by the publisher server, the separate iFrames belonging to a domain of the content server that is different from a domain to which the publisher server belongs, and one of the iFrames being a primary iFrame and each of the other iFrames being secondary iFrames, and iFrame for displaying one or more of the content items received from the content server;
   generating a primary content item request to the content server for the primary iFrame, the primary content item request being a request for respective first content items for display in the primary iFrame and respective content items for display in each of the secondary iFrames;
   receiving, from the content server, the respective first and second content items;
   generating, for each secondary iFrame, a secondary content item request to the content server to initialize each secondary iFrame to the domain of the content server;
   displaying, in the primary iFrame, the respective first content items received from the content server for display in the primary iFrame; and
   providing, from the primary iFrame to each secondary iFrame, the respective second content items for display in the secondary iFrames.

20. A method performed by a client device, the method comprising:
   defining separate iFrames in a web page served by a publisher server, the separate iFrames belonging to a domain of the content server that is different from a domain to which the publisher server belongs, and one of the iFrames being a primary iFrame and each of the other iFrames being secondary iFrames, and iFrame for displaying one or more content items received from the content server;
   generating a primary content item request to the content server for the primary iFrame, the primary content item request being a request for respective content items for display in the primary iFrame and respective content items for display in each of the secondary iFrames;
   generating, for each secondary iFrame, a second content item request to the content server to initialize each secondary iFrame to the domain of the content server;
   displaying, in the primary iFrame, the respective content items received from the content server for display in the primary iFrame;
   providing, from the primary iFrame to each secondary iFrame, the respective content items for display in the secondary iFrames;
   receiving, for each iFrame in response to its respective request, cascade style sheet data defining a style by which the respective content items for the secondary content item environment are to be displayed;
   displaying, in the primary iFrame, the respective content items received from the content server for display in the primary iFrame comprises identifying document object model nodes that include data defining the respective content items for the primary iFrame and rendering the respective content items in the primary iFrame according to the cascade style sheet defining the style by which the respective content items for the primary iFrame are to be displayed; and wherein providing, from the primary iFrame to each secondary iFrame, the respective content items for display in the secondary iFrames comprises, for each secondary iFrame:
- identifying document object model nodes that include data defining the respective content items for the secondary iFrame;
- providing the document object model nodes to the secondary iFrame; and
- rendering the respective content items in the secondary iFrame according to the cascade style sheet defining the style by which the respective content items for the secondary iFrame are to be displayed.

21. The method of claim 19, wherein:
the respective first and second content items received are each tagged with an identifier that identifies a respective iFrame; and
providing, from the primary iFrame to each secondary iFrame, the respective second content items for display in the secondary iFrames comprises providing, for each respective iFrame, only the respective second content items that are tagged with the identifier that identifies the respective iFrame.

22. A system, comprising:
a client device including a computer storage medium encoded with instructions that when executed by the client device cause the client device to request content items from a content server and process the content items upon receipt, the instructions comprising:

content item environment definition instructions for a web page, the web page including publisher content provided by the publisher, the publisher content for display in the web page, and that upon execution cause the client device perform operations comprising:

instantiating separate content item environments in the web page served by the publisher server each separate content item environment being an environment in which to display content items provided by a content server that is different from the publisher server, the separate content item environments having administrative authority for a domain of the content server that is different from the domain of publisher server, and one of the content item environments being defined as a primary content item environment and each of the other content item environments being defined as secondary content item environments, and each content item environment displays one or more of the content items received from the content server;

generating a primary content item request to the content server for the primary content item environment, the primary content item request being a request for respective first content items for display in the primary content item environment and, for each secondary content item environment, respective second content items for display in each of the secondary content item environments;

receiving, from the content server, the respective first and second content items, and first content item environment instructions in response to the primary content item request and that upon execution cause the client device perform operations comprising:
- displaying, in the primary content item environment, the respective first content items received from the content server for display in the primary content item environment; and
- providing from the primary content item environment to each secondary content item environment the respective second content items for display in the secondary content item environments.

* * * * *